United States Patent
Zhu (10) Patent No.: US 11,050,621 B2
(45) Date of Patent: Jun. 29, 2021

(54) CLIENT, SERVER AND DIFFERENTIAL UPGRADE METHOD

(71) Applicant: ZTE CORPORATION, Guangdong (CN)

(72) Inventor: Yunlong Zhu, Guangdong (CN)

(73) Assignee: ZTE CORPORATION

( * ) Notice: Subject to any disclaimer, the term of this patent is extended or adjusted under 35 U.S.C. 154(b) by 29 days.

(21) Appl. No.: 16/492,286

(22) PCT Filed: Mar. 9, 2018

(86) PCT No.: PCT/CN2018/078608
§ 371 (c)(1),
(2) Date: Sep. 9, 2019

(87) PCT Pub. No.: WO2018/161964
PCT Pub. Date: Sep. 13, 2018

(65) Prior Publication Data
US 2020/0084092 A1    Mar. 12, 2020

(30) Foreign Application Priority Data

Mar. 10, 2017   (CN) .............................. 201710139693

(51) Int. Cl.
G06F 15/173 (2006.01)
H04L 12/24 (2006.01)
G06F 9/455 (2018.01)
H04L 29/08 (2006.01)

(52) U.S. Cl.
CPC .......... *H04L 41/082* (2013.01); *G06F 9/455* (2013.01); *H04L 41/0853* (2013.01); *H04L 67/34* (2013.01)

(58) Field of Classification Search
CPC ... H04L 41/082; H04L 41/0853; H04L 67/34; G06F 9/455
USPC ........................................................ 709/223
See application file for complete search history.

(56) References Cited

U.S. PATENT DOCUMENTS

| 8,346,913 B2 * | 1/2013 | Gao .......................... G06F 8/65 709/224 |
| 8,958,780 B2 * | 2/2015 | Smith .................... H04L 67/303 455/414.3 |
| 9,086,941 B1 * | 7/2015 | Siegel ....................... G06F 8/65 |
| 9,113,282 B2 * | 8/2015 | Chene ..................... H04L 67/10 |
| 9,201,641 B2 * | 12/2015 | Gallo ....................... G06F 8/65 |
| 9,311,071 B2 * | 4/2016 | Tan ........................ G06F 8/656 |

(Continued)

FOREIGN PATENT DOCUMENTS

| CN | 103186391 A | 7/2013 |
| CN | 104063239 A | 9/2014 |

OTHER PUBLICATIONS

English Translations of International Search Report dated Jun. 5, 2018; International Patent Application No. PCT/CN2018/078608 filed Mar. 9, 2018. ISA/CN.

*Primary Examiner* — Melvin H Pollack
(74) *Attorney, Agent, or Firm* — McDonald Hopkins LLC (57) ABSTRACT

Provided are a client, a server and a differential upgrade method. The client includes: an identification module, which is configured to acquire, from a server, upgrade configuration information corresponding to preset requirement information; and a loading module, which is configured to load an upgrade process corresponding to the acquired upgrade configuration information from the server.

18 Claims, 2 Drawing Sheets

(56) References Cited

U.S. PATENT DOCUMENTS

| | | | |
|---|---|---|---|
| 9,489,496 B2 * | 11/2016 | Wysocki | H04L 63/0435 |
| 9,535,924 B2 * | 1/2017 | MacKenzie | G06F 16/1767 |
| 9,549,385 B2 * | 1/2017 | Seligson | H04L 41/082 |
| 9,557,889 B2 * | 1/2017 | Raleigh | H04M 15/44 |
| 9,558,353 B2 * | 1/2017 | Marino | G06F 3/0619 |
| 9,619,244 B2 * | 4/2017 | Fan | G06F 8/658 |
| 9,710,256 B2 * | 7/2017 | Deng | G06F 8/654 |
| 9,742,872 B2 * | 8/2017 | Xie | H04L 67/34 |
| 9,804,933 B2 * | 10/2017 | Wei | G06F 11/0793 |
| 9,836,300 B2 * | 12/2017 | Moeller | H04L 67/34 |
| 9,843,624 B1 * | 12/2017 | Taaghol | H04L 41/0803 |
| 10,114,665 B2 * | 10/2018 | Combellas | G06F 9/45558 |
| 10,140,113 B2 * | 11/2018 | Li | G06F 16/148 |
| 10,175,970 B2 * | 1/2019 | Li | H04L 67/34 |
| 10,203,950 B2 * | 2/2019 | Tian | G06F 8/65 |
| 10,229,134 B2 * | 3/2019 | Chiu | G06F 16/113 |
| 10,374,888 B2 * | 8/2019 | Mahimkar | H04L 41/145 |
| 10,374,894 B2 * | 8/2019 | Miller | G05B 23/0256 |
| 10,466,994 B2 * | 11/2019 | Fodor | H04L 41/082 |
| 10,594,798 B2 * | 3/2020 | Rodrigues Nascimento | H04W 4/44 |
| 10,623,929 B1 * | 4/2020 | Harpale | H04W 12/06 |
| 10,809,999 B2 * | 10/2020 | Adrangi | H04W 4/50 |
| 10,856,131 B2 * | 12/2020 | Ryu | H04W 60/00 |
| 2012/0210312 A1 | 8/2012 | Ma et al. | |
| 2015/0100955 A1 * | 4/2015 | Chen | G06F 8/658 717/170 |
| 2015/0220326 A1 * | 8/2015 | Jia | G06F 8/71 717/170 |
| 2015/0227268 A1 * | 8/2015 | Rathod | G06F 8/61 715/739 |
| 2017/0163787 A1 * | 6/2017 | Xu | H04M 1/72525 |
| 2017/0286092 A1 * | 10/2017 | Zhu | G06F 11/1469 |
| 2018/0191720 A1 * | 7/2018 | Dawes | G06Q 50/26 |
| 2019/0146776 A1 * | 5/2019 | Chen | G06F 9/445 717/169 |

* cited by examiner

CLIENT, SERVER AND DIFFERENTIAL UPGRADE METHOD

CROSS-REFERENCE TO RELATED APPLICATION

This application is a 35 U.S.C. 371 national stage filing of PCT Application No. PCT/CN2018/078608 filed on Mar. 9, 2018, entitled "CLIENT, SERVER AND DIFFERENTIAL UPGRADE METHOD" which claims priority to Chinese Patent Application No. 201710139693.6 filed on Mar. 10, 2017, the disclosures of each are incorporated herein in their entirety by reference.

TECHNICAL FIELD

The present disclosure relates to terminal application techniques and, in particular, to a client, a server and a differential upgrade method.

BACKGROUND

In the field of mobile phone upgrading, more and more differentiation requirement are provided. For example, several projects are provided in a region (such as the project for designing a certain mobile phone model, the project for designing a certain Application (APP) on the phone, the project for designing a certain operating system). Each project generates many different requirements. These requirements may have unclear definitions, or even frequently be changed, and even if these requirements are unified, the requirements are unable to meet differentiation of different projects or unable to meet using habits of users in different regions.

For such situation, the current processing mode is to configure through a terminal according to different project differentiation, to modify codes at the terminal, to add macro control of the project, and then to find corresponding projects according to the changes of the requirements for modifying so as to achieve the differentiation requirement management. However, if too many projects or too many differentiation requirements are provided, an obvious problem will exist. That is, it is very difficult to control only through the terminal, the code processing process becomes more and more cumbersome, and a same project may change the requirements in different periods, which will frequently involve modifications of terminal codes. These modifications will possibly introduce new problems and verification for such new problems is needed, which will take a lot of manpower, money and time.

SUMMARY

To overcome the defects in the existing art, the present disclosure provides a client, a server and a differential upgrade method for solving the problem in which the upgrade process is difficult to be controlled by the client and the maintenance is troublesome when the differentiation requirements are excessive.

To solve the above problem, a client for implementing the differential upgrade in the embodiment of the present disclosure includes:
an identification module, which is configured to acquire, from a server, upgrade configuration information corresponding to preset requirement information; and
a loading module, which is configured to load an upgrade process corresponding to the acquired upgrade configuration information from the server.

In an embodiment of the present disclosure, the loading module is further configured to load an entry attachment corresponding to the acquired upgrade configuration information from the server.

In an embodiment of the present disclosure, the client further includes:
a transmission module, which is configured to transmit to the server pieces of requirement information, requirement identifiers respectively corresponding to the pieces of requirement information, and configuration modes respectively corresponding to the pieces of requirement information to enable the server to configure respective upgrade processes according to the configuration modes and configure respective pieces of upgrade configuration information for the upgrade processes;
the identification module, which is specifically configured to acquire, according to a requirement identifier corresponding to the preset requirement information, the upgrade configuration information corresponding to the preset requirement information from the server.

In an embodiment of the present disclosure, the identification module is specifically configured to receive a message carrying a configuration page and/or a version description pushed by the server; and acquire the upgrade configuration information corresponding to the preset requirement information from the configuration page and/or the version description.

To solve the above problem, a server for implementing the differential upgrade in the embodiment of the present disclosure includes:
an information configuration module, which is configured to configure pieces of upgrade configuration information respectively corresponding to pieces of requirement information of a client; and
a process configuration module, which is configured to configure, according to the pieces of upgrade configuration information, upgrade processes respectively corresponding to the pieces of upgrade configuration information.

In an embodiment of the present disclosure, the server further includes:
an attachment configuration module, which is configured to configure, according to the pieces of upgrade configuration information, entry attachments respectively corresponding to the pieces of upgrade configuration information.

In an embodiment of the present disclosure, the information configuration module is specifically configured to acquire pieces of requirement information of the client, requirement identifiers respectively corresponding to the pieces of requirement information, and configuration modes respectively corresponding to the pieces of requirement information.

the process configuration module is specifically configured to configure a corresponding upgrade process for each of the pieces of requirement information according to a configuration mode of the each of the pieces of requirement information, and configure corresponding upgrade configuration information for the corresponding upgrade process according to a requirement identifier of the each of the pieces of requirement information.

In an embodiment of the present disclosure, the server further includes:

a pushing module, which is configured to add a piece of upgrade configuration information in a configuration page and/or a version description; and push a message carrying the configuration page and/or the version description to the client.

To solve the above problem, a differential upgrade method in the embodiment of the present disclosure includes:

acquiring, from a server, upgrade configuration information corresponding to preset requirement information; and loading an upgrade process corresponding to the acquired upgrade configuration information from the server.

In an embodiment of present disclosure, the loading the upgrade process corresponding to the acquired upgrade configuration information from the server further includes:

loading an entry attachment corresponding to the acquired upgrade configuration information from the server.

In an embodiment of the present disclosure, before acquiring, from the server, the upgrade configuration information corresponding to the preset requirement information, the method further includes: transmitting to the server pieces of requirement information, requirement identifiers respectively corresponding to the pieces of requirement information, and configuration modes respectively corresponding to the pieces of requirement information to enable the server to configure respective upgrade processes according to the configuration modes and configure respective pieces of upgrade configuration information for the upgrade processes.

The acquiring, from the server, the upgrade configuration information corresponding to the preset requirement information includes: acquiring, according to a requirement identifier corresponding to the preset requirement information, the upgrade configuration information corresponding to the preset requirement information from the server.

In an embodiment of the present disclosure, before acquiring, from the server, the upgrade configuration information corresponding to the preset requirement information, the method further includes:

receiving a message carrying a configuration page and/or a version description pushed by the server; and acquiring the upgrade configuration information corresponding to the preset requirement information from the configuration page and/or the version description.

To solve the above problem, a differential upgrade method which is applied to a server in the embodiment of the present disclosure includes:

configuring pieces of upgrade configuration information respectively corresponding to pieces of requirement information of a client; and configuring, according to the pieces of upgrade configuration information, upgrade processes respectively corresponding to the pieces of upgrade configuration information.

In an embodiment of the present disclosure, the configuring the corresponding upgrade process according to the each piece of upgrade configuration information further includes:

configuring, according to the pieces of upgrade configuration information, entry attachments respectively corresponding to the pieces of upgrade configuration information.

In an embodiment of the present disclosure, the configuring the pieces of upgrade configuration information respectively corresponding to the pieces of requirement information of the client; and configuring, according to the each piece of upgrade configuration information, the upgrade processes respectively corresponding to the pieces of upgrade configuration information include:

acquiring pieces of requirement information of the client, requirement identifiers respectively corresponding to the pieces of requirement information, and configuration modes respectively corresponding to the pieces of requirement information; and configuring a corresponding upgrade process for each of the pieces of requirement information according to a configuration mode of each of the pieces of requirement information, and configuring a corresponding upgrade configuration information for the corresponding upgrade process according to a requirement identifier of each of the pieces of requirement information.

In an embodiment of the present disclosure, after configuring, according to the pieces of upgrade configuration information, the upgrade processes corresponding to the pieces of upgrade configuration information, the method further includes:

adding a piece of upgrade configuration information in a configuration page and/or a version description; and pushing a message carrying the configuration page and/or the version description to the client.

Another embodiment of the present disclosure further provides a storage medium. The storage medium stores computer programs which, when run, execute the steps of any one of the method embodiments described above.

Another embodiment of the present disclosure further provides an electronic apparatus, including a memory and a processor. The memory is configured to store computer programs and the processor is configured to run the computer programs for executing the steps of any one of the method embodiments described above.

Embodiments of the present disclosure have the following beneficial effects.

A client, a server and a differential upgrade method in the embodiment of the present disclosure effectively solve the problem in which the upgrade process is difficult to be controlled by the client and the maintenance is troublesome when the differentiation requirements are excessive.

BRIEF DESCRIPTION OF DRAWINGS

The drawings described herein are used to provide a further understanding of the present disclosure and form a part of the present application. The exemplary embodiments and descriptions thereof in the present disclosure are used to explain the present disclosure and not to limit the present disclosure in any improper way. In the drawings.

DETAILED DESCRIPTION

To solve the problems in which the upgrade process is difficult to be controlled by the client and the maintenance is troublesome when the differentiation requirements are excessive, embodiments of the present disclosure provide a client, a server and a differential upgrade method. The present disclosure will be described hereinafter in detail in conjunction with the drawings and embodiments. It is to be understood that the specific embodiments described herein are merely intended to explain and are not to limit the embodiments of the present disclosure.

Figure 1:
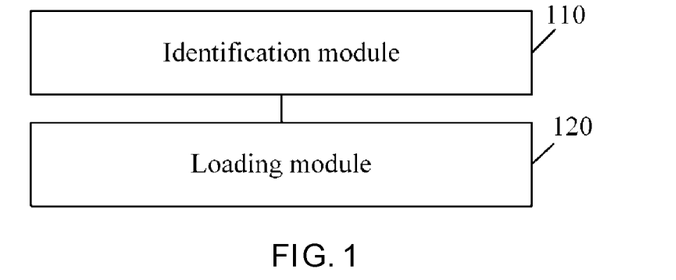
FIG. 1 is a structural diagram of hardware of a client according to an embodiment of the present disclosure.

As shown in FIG. 1, a first embodiment of the present disclosure provides a client for implementing the differential upgrade, and the client includes: an identification module 110 and a loading module 120.

The identification module 110 is configured to acquire, from a server, upgrade configuration information corresponding to preset requirement information.

The loading module 120 is configured to load an upgrade process corresponding to the acquired upgrade configuration information from the server.

In the field of upgrading, the client (such as mobile terminal) faces more and more differentiation requirements. For example, several projects are provided in a region, many different requirements are generated for meeting the habits of different local people and requirement results of the project discussion, even according to some decision opinions. These requirements may even have the problem of unclear definition and frequently be changed, and even if the requirements are unified, the requirements are unable to meet differentiation of different projects or unable to meet using habits of users in different regions.

In terms of this case, the current processing manner is to apply control of different projects at a terminal so as to achieve management for different requirements. However, if too many projects or too many differentiation requirements are provided, an apparent problem will exist, i.e., it is very difficult to control only through the terminal, the code processing process becomes more and more cumbersome, and a same project may change the requirements in different periods, which will frequently involve modifications of terminal codes, and whether such modifications introduce new problems, verification for such problems and subsequent tests will take a lot of manpower and time. For a same problem, current requirements are inconsistent with the latter, but then the requirements may be changed back to the current requirements, such that the modification of the requirement definition involves the modification of the terminal codes, which will bring the problems described above.

In the embodiment of the present disclosure, the client acquires the upgrade configuration information corresponding to the preset requirement information from the server, and loads the upgrade process corresponding to the acquired upgrade configuration information from the server, thereby effectively solving the problem in which the upgrade process is difficult to be controlled by the client and the maintenance is troublesome when the differentiation requirements are excessive. That is, by pre-configuring the required information or the differentiation content through the server, the client can automatically perform differentiation processing process by loading the information after the server configuration, and go through the corresponding process. Different terminal processes and interfaces may be presented for different projects, which saves a control flow during the upgrade process and makes the configuration and loading completely clear.

It is to be noted that the preset requirement information may be acquired by performing multiple investigations based on projects, and may also be acquired by a designer based on project design concepts. And the preset requirement information may be stored in the server in advance in a form of a list. For example, a preset requirement information list may be preconfigured in the server, the list may include two columns, a first column stores the preset requirement information, and a second column stores corresponding upgrade configuration information configured for each piece of preset requirement information. However, the preset requirement information includes, but is not limited to, being stored in the server in advance in the form of the list.

On the basis of the above embodiment, modified embodiments of the above embodiment are further proposed, and it is to be noted that herein, for the brevity of description, only differences from the above embodiment will be described in the modified embodiments.

In an embodiment of the present disclosure, the loading module 120 is further configured to load an entry attachment corresponding to the acquired upgrade configuration information from the server.

The embodiment of the present disclosure, through storing entry files corresponding to the requirement information on the server, when differentiation requirements occur, reads and identifies an entry attachment corresponding to the identified requirement information through scheduling modules, thereby meeting requirements of different regions for different entries. For example, English entries are required in English regions, and Chinese entries are required in Chinese regions.

Furthermore, the client may further include: a transmission module.

The transmission module is configured to transmit to the server pieces of requirement information, requirement identifiers respectively corresponding to the pieces of requirement information, and configuration modes respectively corresponding to the pieces of requirement information to enable the server to configure respective upgrade processes according to the configuration modes and configure respective pieces of upgrade configuration information for the upgrade processes.

The identification module is specifically configured to acquire, according to a requirement identifier corresponding to the preset requirement information, the upgrade configuration information corresponding to the preset requirement information from the server.

The requirement identifier may be in a keyword format. For example, the requirement information can only be performed through wifi in a downloading process. In this case, a keyword of "wifionly" may be taken as the requirement identifier corresponding to the requirement information.

In another embodiment of the present disclosure, the identification module 110 is specifically configured to receive a message carrying a configuration page and/or a version description pushed by the server; and acquire the upgrade configuration information corresponding to the preset requirement information from the configuration page and/or the version description.

Figure 2:
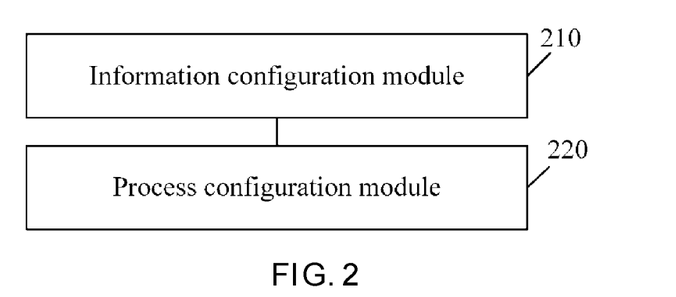
FIG. 2 is a structural diagram of hardware of a server according to an embodiment of the present disclosure.

As shown in FIG. 2, the present disclosure further provides a server for implementing the differential upgrade, and the server includes: an information configuration module 210 and a process configuration module 220.

The information configuration module 210 is configured to configure pieces of upgrade configuration information respectively corresponding to pieces of requirement information of a client.

The process configuration module 220 is configured to configure, according to the pieces of upgrade configuration information, upgrade processes respectively corresponding to the pieces of upgrade configuration information.

The server in the embodiment of the present disclosure may push the upgrade configuration information to the client through pre-configuring the upgrade configuration information, so that the client acquires the upgrade configuration information corresponding to the preset requirement information from the server; and loads an upgrade process corresponding to the acquired upgrade configuration information from the server, so that the client saves the control flow during the upgrade process, makes the configuration and loading completely clear, thereby effectively solving the problem in which the upgrade process is difficult to be controlled by the client and the maintenance is troublesome when the differentiation requirements are excessive.

In an embodiment of the present disclosure, the server further includes: an attachment configuration module.

The attachment configuration module is configured to configure, according to the pieces of upgrade configuration information, entry attachments respectively corresponding to the pieces of upgrade configuration information.

Furthermore, the information configuration module 210 is specifically configured to acquire pieces of requirement information of the client, requirement identifiers respectively corresponding to the pieces of requirement information, and configuration modes respectively corresponding to the pieces of requirement information.

The process configuration module 220 is specifically configured to configure a corresponding upgrade process for each of the pieces of requirement information according to a configuration mode of the each of the pieces of requirement information, and configure corresponding upgrade configuration information for the corresponding upgrade process according to a requirement identifier of the each of the pieces of requirement information.

In another embodiment of the present disclosure, the server further includes: a pushing module.

The pushing module is configured to add a piece of upgrade configuration information in a configuration page and/or a version description; and push a message carrying the configuration page and/or the version description to the client.

It is to be noted that the server may further include a storage module. The storage module is configured to store a preset requirement information list. The list may include two columns, a first column stores preset requirement information, and a second column stores corresponding upgrade configuration information configured for each piece of preset requirement information. The embodiment of the present disclosure aims to meet various differentiation requirements in a server configuration mode, through preconfiguring upgrade configuration information and the upgrade process by the server, in this case, if differentiation requirements are provided, a requirement point of the local client is only need to be configured at the server. The client may go through the corresponding process according to the upgrade configuration information of the server, thereby solving the problem in which the upgrade process is difficult to be controlled by the client and the maintenance is troublesome when the differentiation requirements are excessive. That is, through one-stop configuring the differentiation upgrade process by the server, requirements are clearly defined and the upgrade control process becomes clear.

For example, at present, requirement information of a project A is that a package searching download process is required to be only performed through wifi; and requirement information of a project B is that the package searching download may be performed in any network format, and the projects A and B have inconsistent requirements on entries presented to the user during the process.

The specific implementation mode of the embodiment of the present disclosure includes the following.

The client needs to pre-define some requirement points (requirement information) in the codes. These requirement points may be occurred before or possibly occurred in the future, then for the problem of frequently modification of the entry, an inlet being capable of reading attachment information of a certain configuration page of the server is added, and the definition of these requirement points is implemented by identifying the keyword. That is, if the server is configured with these keywords, the client is able to read and go through different differentiation process according to these keywords. If a certain keyword is not read, then the process in this keyword is a default process. As a whole, the client has a set of default process, the client goes through the corresponding process when the keyword is read, and goes through the default process when no keyword is read.

The server needs to fill the configuration information in a configuration page capable of filling the configuration information, or in a version description at the time of uploading the upgrade package. The projects with differentiation requirements fill the configuration information at the time of publishing the version or changing the requirements, the configuration information has some predefined keywords and attachments of all corresponding entries. Because the requirement changing is generally embodied in the version, the work can be done when uploading the upgrade package, i.e., the person who uploads the upgrade package fills the configuration information.

In this example, the keyword defined by the terminal may be wifionly. Therefore, the version description or the configuration page of the server is filled with the keyword, and then uploads the corresponding attachment of the entry to be stored. That is, a wifionly field is predefined at the client and the judgment of reading the wifionly field is added.

An interaction process of the client and the server is described below.

In step 1, the server pushes a message to the client.

In step 2, the message pushed by the server is received.

In step 3, if the wifionly field is read from the message, a process in which the codes only allow wifi to finish the package searching download process is only gone through. If the wifionly field is not read, a process in which any default network mode is allowed to finish the package searching download process is gone through.

In step 4, the client loads and completes the whole configuration process.

Meanwhile, the projects A and B have different translation for the entry, and attachments are added to introduce translation entries respectively wanted by the projects A and B when the keywords are configured. In this case, the whole process is completed, and the differential upgrade method and system process are completed.

That is, the client defines the requirement information or the requirement information possibly occurred, and transmits the definition of these keywords and configuration mode to the server or transmits the projects or the people who is responsible for uploading the upgrade package. After the project requirements are completed or the differentiation requirements occur, the people who uploads the upgrade package selects whether to fill the configuration information according to whether the requirements are provided. After the configuration information are successfully saved and the upgrade package is released, the client preloads the configuration information at the startup time, and presents different functions according to the identified information.

Based on the above client and server, the embodiment of the present disclosure further provides a differential upgrade method.

Figure 3:
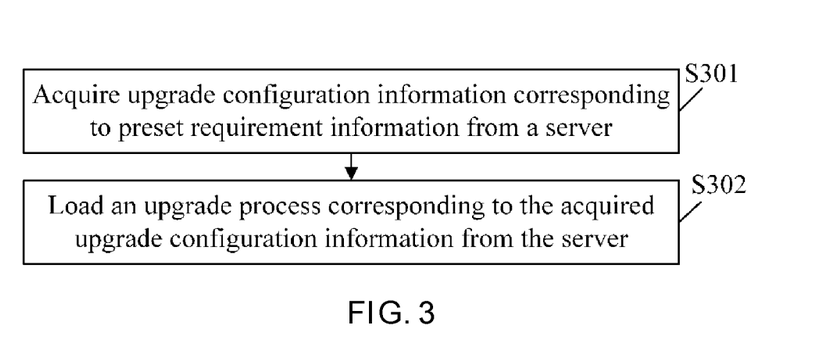
FIG. 3 is a flowchart of a differential upgrade method for a client according to an embodiment of the present disclosure.

As shown in FIG. 3, a differential upgrade method in the embodiment of the present disclosure is applied to a client. The method includes the steps described below.

In step S301, upgrade configuration information corresponding to preset requirement information is acquired from a server.

In step S302, an upgrade process corresponding to the acquired upgrade configuration information is loaded from the server.

The step in which the upgrade process corresponding to the acquired upgrade configuration information is loaded from the server further includes:

loading an entry attachment corresponding to the acquired upgrade configuration information from the server.

Furthermore, before the step in which the upgrade configuration information corresponding to the preset requirement information is acquired from the server, the method further includes:

transmitting to the server pieces of requirement information, requirement identifiers respectively corresponding to the pieces of requirement information, and configuration modes respectively corresponding to the pieces of requirement information to enable the server to configure respective upgrade processes according to the configuration modes and configure respective pieces of upgrade configuration information for the upgrade processes.

The step in which the upgrade configuration information corresponding to the preset requirement information is acquired from the server includes:

acquiring, according to a requirement identifier corresponding to the preset requirement information, the upgrade configuration information corresponding to the preset requirement information from the server.

Furthermore, the step in which the upgrade configuration information corresponding to the preset requirement information is acquired from the server includes:

receiving a message carrying a configuration page and/or a version description pushed by the server; and
acquiring the upgrade configuration information corresponding to the preset requirement information from the configuration page and/or the version description.

Figure 4:
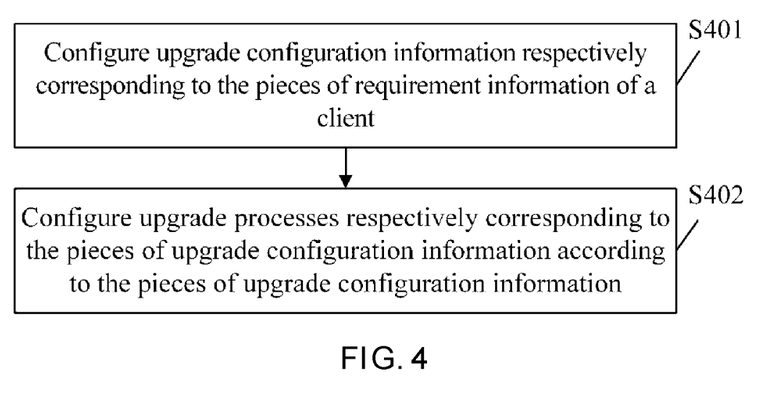
FIG. 4 is a flowchart of a differential upgrade method for a server according to an embodiment of the present disclosure.

As shown in FIG. 4, a differential upgrade method in the embodiment of the present disclosure is applied to a server. The method includes the steps described below.

In step S401, upgrade configuration information respectively corresponding to pieces of requirement information of a client is configured.

In step S402, upgrade processes respectively corresponding to the pieces of upgrade configuration information are configured according to the pieces of upgrade configuration information.

The step in which upgrade processes respectively corresponding to the pieces of upgrade configuration information are configured according to the pieces of upgrade configuration information further includes:

configuring, according to the pieces of upgrade configuration information, entry attachments respectively corresponding to the pieces of upgrade configuration information.

Furthermore, the steps in which the pieces of upgrade configuration information respectively corresponding to the pieces of requirement information of the client are configured; and the upgrade processes respectively corresponding to the pieces of upgrade configuration information are configured according to the each piece of upgrade configuration information include:

acquiring pieces of requirement information of the client, requirement identifiers respectively corresponding to the pieces of requirement information, and configuration modes respectively corresponding to the pieces of requirement information; and
configuring a corresponding upgrade process for each of the pieces of requirement information according to a configuration mode of each of the pieces of requirement information, and configuring a corresponding upgrade configuration information for the corresponding upgrade process according to a requirement identifier of each of the pieces of requirement information.

Furthermore, after the upgrade processes corresponding to the pieces of upgrade configuration information are configured according to the pieces of upgrade configuration information, the method further includes:

adding a piece of upgrade configuration information in a configuration page and/or a version description; and
pushing a message carrying the configuration page and/or the version description to the client.

The differential upgrade method in the embodiment of the present disclosure preconfigures terminal information through the server, so that if differentiation requirements are provided, requirement points only need to be configured at the server, then the corresponding process may be gone through according to the configuration information of the server at the server, thereby solving the problem in which the upgrade process is difficult to be controlled by the client and the maintenance is troublesome when the differentiation requirements are excessive. That is, through one-stop configuring the differentiation upgrade process by the server, requirements are clearly defined and the upgrade control process becomes clear.

The differential upgrade method described in conjunction with the embodiments of the present disclosure may be directly embodied as hardware, a software module executed by a processor, or a combination of the hardware and the software module. For example, for one or more functional block diagrams and one or more combination of the functional block diagrams in the functional block diagrams shown in FIGS. 1 and 2, (for example, load modules not only can correspond to each software module, but also can correspond to each hardware module of the computer program flow. These software modules can respectively correspond to various steps shown in FIGS. 4 and 3. These hardware modules may be implemented, for example, by using a field programmable gate array (FPGA) to cure these software modules.

The software modules may be located at a RAM, a flash memory, a ROM, a EPROM, a EEPROM, a register, a hard disk, a mobile hard disk, a CD-ROM or any other form of storage medium known in the art. A storage medium may be coupled to the processor such that the processor is able to read information from, and write information to, the storage medium; or the storage medium may be a component of the processor The processor and the storage medium may be located in an application specific integrated circuit. The software module may be stored in a memory of the mobile terminal or in a memory card which is insertable into the mobile terminal. For example, if the mobile terminal employs a MEGA-SIM card or a flash memory device with a large capacity, the software module may be stored in the MEGA-SIM card or flash memory device with a large capacity. For one or more functional block diagrams and one or more combinations of the functional block diagrams in the functional block diagrams shown in FIGS. 1 and 2, at least one of them may be implemented as a general purpose processor, a digital signal processor (DSP), an application specific integrated circuit (ASIC), a field programmable gate array (FPGA) or another programmable logic apparatus, separate gate or transistor logic device, separate hardware component, or any combination thereof for executing the functions described in the present disclosure. For one or more functional block diagrams and one or more combinations of the functional block diagrams in the functional block diagrams shown in FIGS. 1 and 2, at least one of them can further implement as a combination of computer devices, such as a combination of the DSP and a microprocessor unit (MPU), multiple microprocessor units, one or more microprocessor units in combination with DSP communication or any other such configuration.

An embodiment of the present disclosure further provides a storage medium. The storage medium is configured to store computer programs which, when run, execute the steps of any one of the above-mentioned method embodiments.

Optionally, in this embodiment, the above-mentioned storage medium may include, but is not limited to, a U disk, a read-only memory (ROM), a random access memory (RAM), a mobile hard disk, a magnetic disk, an optical disk or another medium capable of storing computer programs.

An embodiment of the present disclosure further provides an electronic apparatus, including a memory and a processor, where the memory is configured to store computer programs and the processor is configured to execute the computer programs for executing the steps in any one of the method embodiments described above.

Although the present application describes specific examples of the present disclosure, those skilled in the art can design variations of the present disclosure without departing from the concepts of the present disclosure.

Those skilled in the art also can make various modifications to the present disclosure without departing from the content of the present disclosure under the enlightenment of the technical concept of the present disclosure, which also falls within the protection scope of the present disclosure.

INDUSTRIAL APPLICABILITY

In embodiment of the present disclosure, the client pre-configures the required information or the differentiation content through the server, the client can automatically perform differentiation processing by loading the information after the server configuration, and go through the corresponding process. Different terminal processes and interfaces may be presented for different projects, which saves the control flow during the upgrade process and makes the configuration and loading completely clear. Therefore, the problem in which the upgrade process is difficult to be controlled by the client and the maintenance is troublesome when the differentiation requirements are excessive is effectively solved.

What is claimed is:

1. A client for implementing a differential upgrade, comprising: a memory and a processor, wherein the memory is configured to store computer programs and the processor is configured to execute the computer programs for performing a method comprising:
   acquiring, from a server, upgrade configuration information corresponding to preset requirement information, wherein the preset requirement information comprises differentiation requirements of different projects; and
   loading an upgrade process corresponding to the acquired upgrade configuration information from the server;
   wherein, before the acquiring, from the server, the upgrade configuration information corresponding to the preset requirement information, the method further comprises: transmitting to the server pieces of requirement information, requirement identifiers respectively corresponding to the pieces of requirement information, and configuration modes respectively corresponding to the pieces of requirement information to enable the server to configure respective upgrade processes according to the configuration modes and configure respective pieces of upgrade configuration information for the upgrade processes.

2. The client of claim 1, wherein the loading the upgrade process corresponding to the acquired upgrade configuration information from the server further comprises:
   loading an entry attachment corresponding to the acquired upgrade configuration information from the server.

3. The client of claim 1, wherein
   the acquiring, from the server, the upgrade configuration information corresponding to the preset requirement information comprises: acquiring, according to a requirement identifier corresponding to the preset requirement information, the upgrade configuration information corresponding to the preset requirement information from the server.

4. The client of claim 1, wherein the acquiring, from the server, the upgrade configuration information corresponding to the preset requirement information comprises:
   receiving a message carrying a configuration page and/or a version description pushed by the server; and
   acquiring the upgrade configuration information corresponding to the preset requirement information from the configuration page and/or the version description.

5. A differential upgrade method, applied to a client, comprising:
   acquiring, from a server, upgrade configuration information corresponding to preset requirement information, wherein the preset requirement information comprises differentiation requirements of different projects; and
   loading an upgrade process corresponding to the acquired upgrade configuration information from the server;
   wherein, before acquiring, from the server, the upgrade configuration information corresponding to the preset requirement information, the method further comprises: transmitting to the server pieces of requirement information, requirement identifiers respectively corresponding to the pieces of requirement information, and configuration modes respectively corresponding to the pieces of requirement information to enable the server to configure respective upgrade processes according to the configuration modes and configure respective pieces of upgrade configuration information for the upgrade processes.

6. The method of claim 5, wherein the loading the upgrade process corresponding to the acquired upgrade configuration information from the server further comprises:
   loading an entry attachment corresponding to the acquired upgrade configuration information from the server.

7. The method of claim 5, wherein
   the acquiring, from the server, the upgrade configuration information corresponding to the preset requirement information comprises: acquiring, according to a requirement identifier corresponding to the preset requirement information, the upgrade configuration information corresponding to the preset requirement information from the server.

8. The method of claim 5, wherein the acquiring, from the server, the upgrade configuration information corresponding to the preset requirement information comprises:
receiving a message carrying a configuration page and/or a version description pushed by the server; and
acquiring the upgrade configuration information corresponding to the preset requirement information from the configuration page and/or the version description.

9. A differential upgrade method, applied to a server, comprising:
configuring pieces of upgrade configuration information respectively corresponding to pieces of requirement information of a client, wherein the preset requirement information comprises differentiation requirements of different projects; and
configuring, according to the pieces of upgrade configuration information, upgrade processes respectively corresponding to the pieces of upgrade configuration information;
wherein the configuring the pieces of upgrade configuration information respectively corresponding to the pieces of requirement information of the client and configuring, according to the each piece of upgrade configuration information, the upgrade processes respectively corresponding to the pieces of upgrade configuration information comprise:
acquiring pieces of requirement information of the client, requirement identifiers respectively corresponding to the pieces of requirement information, and configuration modes respectively corresponding to the pieces of requirement information; and
configuring a corresponding upgrade process for each of the pieces of requirement information according to a configuration mode of each of the pieces of requirement information, and configuring a corresponding upgrade configuration information for the corresponding upgrade process according to a requirement identifier of each of the pieces of requirement information.

10. The method of claim 9, wherein the configuring the corresponding upgrade process according to the each piece of upgrade configuration information further comprises:
configuring, according to the pieces of upgrade configuration information, entry attachments respectively corresponding to the pieces of upgrade configuration information.

11. The method of claim 9, wherein after configuring, according to the pieces of upgrade configuration information, the upgrade processes corresponding to the pieces of upgrade configuration information, the method further comprises:
adding a piece of upgrade configuration information in a configuration page and/or a version description; and
pushing a message carrying the configuration page and/or the version description to the client.

12. A non-transitory storage medium, which is configured to store computer programs which, when run, execute the method of claim 5.

13. An electronic apparatus, comprising a memory and a processor, wherein the memory is configured to store computer programs and the processor is configured to execute the computer programs for executing the method of claim 5.

14. A non-transitory storage medium, which is configured to store computer programs which, when run, execute the method of claim 9.

15. A server for implementing a differential upgrade, comprising a memory and a processor, wherein the memory is configured to store computer programs and the processor is configured to execute the computer programs to perform the method of claim 9.

16. The method of claim 6, wherein
the acquiring, from the server, the upgrade configuration information corresponding to the preset requirement information comprises: acquiring, according to a requirement identifier corresponding to the preset requirement information, the upgrade configuration information corresponding to the preset requirement information from the server.

17. The method of claim 6, wherein the acquiring, from the server, the upgrade configuration information corresponding to the preset requirement information comprises:
receiving a message carrying a configuration page and/or a version description pushed by the server; and
acquiring the upgrade configuration information corresponding to the preset requirement information from the configuration page and/or the version description.

18. The method of claim 10, wherein after configuring, according to the pieces of upgrade configuration information, the upgrade processes corresponding to the pieces of upgrade configuration information, the method further comprises:
adding a piece of upgrade configuration information in a configuration page and/or a version description; and
pushing a message carrying the configuration page and/or the version description to the client.

* * * * *